THERMOELECTRIC GENERATOR

Filed April 21, 1967

Inventor:
NICHOLAS E. PRYSLAK
By M. Y. Epstein
Attorney

United States Patent Office 3,794,526
Patented Feb. 26, 1974

3,794,526

THERMOELECTRIC GENERATOR

Nicholas E. Pryslak, Summit, N.J., assignor to the United States of America as represented by the United States Atomic Energy Commission Filed Apr. 21, 1967, Ser. No. 634,805
Int. Cl. H01v *1/04*
U.S. Cl. 136—205 1 Claim

ABSTRACT OF THE DISCLOSURE

A thermoelectric generator having a rigid coupling or "stack" between the heat source and the hot strap joining the thermoelements. The stack includes a member of an insulating material, such as ceramic, for electrically isolating the thermoelements from the heat source, and a pair of members of a ductile material, such as gold, one each on each side of the insulating member, to absorb thermal differential expansion stresses in the stack.

BACKGROUND OF THE INVENTION

This invention relates to thermoelectric generators. The invention described herein was made in the course of, or under a contract with the United States Atomic Energy Commission.

Thermoelectric generators comprise, generally, a pair of thermoelements each having a heated end and a cooled end, and means for heating and cooling said ends, respectively. For effiecient transfer of heat from a heat source to the heated ends, and to provide a strong assembly, it is the practice, in certain types of thermoelectric generators, to rigidly bond the heated ends of the thermoelements to the heat source, To electrically isolate the thermoelements from the heat source, an insulating member is often included in the joint between the thermoelements and the heat source. A problem that has long existed in such generators is that, owing to the differences in the coefficients of thermal expansion of the various members in the joint between the thermoelements and the heat source, cracking of various portions of the thermoelectric generators often occurs due to thermal differential expansion stresses.

One prior art solution, used with thermoelectric generators operating with hot end temperatures in the order of 500° C., in the provision of a plurality of stress equalizer members in the joint between the thermoelement hot ends and the heat source. That is, members having different coefficients of thermal expansion are incorporated in the joint in such combination that the thermal stresses generated between the various members of the joint are caused to oppose one another in such manner as to balance or cancel the thermal stresses through the joint. Although this solution is generally successful, it is found that with generators to be operated at higher temperatures, e.g. around 800° C., the stress balanced joints are somewhat difficult and expensive to fabricate.

SUMMARY OF THE INVENTION

An object of this invention is to provide novel and improved thermoelectric generators.

A further object of this invention is to provide, in thermoelectric generators of the type described having rigid and high thermal conductance bonds between the thermoelements and the heat source, novel and improved means for avoiding cracking of component parts of the generators due to thermal differential expansion stresses.

For achieving these objects, the hot end of each of the thermoelements is rigidly bonded to a heat source through a plurality of members forming a column or stack. The stack comprises an insulating member for electrically insulating the thermoelements from the heat source, and a pair of ductile members, one each one on each side of the insulating member, for absorbing or relieving thermally induced stresses. For efficient transfer of heat from the heat source to the thermoelements, the insulating and ductile members preferably have high thermal conductances. In a preferred embodiment, the insulating member is made from beryllia ceramic and the ductile members are of gold.

DESCRIPTION OF THE PREFERRED EMBODIMENTS

Figure 1:
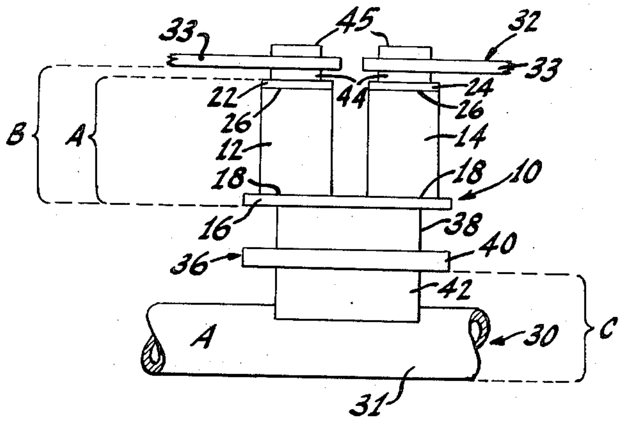
FIG. 1 is a front elevation of a thermoelectric generator, portions thereof being partly broken away.

The thermoelectric device or generator 10 shown in FIG. 1 comprises N type and P type semiconductor thermoelements 12 and 14, respectively. Each thermoelement can be any one of several known materials. In this embodiment each of the thermoelements comprises a silicon-germanium alloy. The P type thermoelement 12 is heavily doped with an electron acceptor element such as boron, aluminum, or gallium from Group III–B of the Chemical Periodic Table, and the N type thermoelement 14 is heavily doped with an electron donor element such as phosphorous or arsenic from Group V–B of the Chemical Periodic Table.

A hot strap 16 is bonded to the hot end 18 of each of the thermoelements 12 and 14. The strap 16 can be any one of several known materials, depending upon the particular application of the generator 10. In this embodiment, the strap 16 is of tungsten. The hot strap 16 can be bonded to the thermoelements 12 and 14 by known means, such as described, for example, in U.S. Pat. 3,235,957 to Horsting for Method of Manufacturing a Thermoelectric Device, issued Feb. 22, 1966.

A pair of metal shoes 22 and 24, preferably of tungsten, are fixed, by any suitable known means, to what are to become the cold ends 26 of the thermoelements 12 and 14. For example, the tungsten shoes 22, 24 can be bonded to the thermoelements by the application of heat and pressure in the same manner and at the same time the hot strap 16 is bonded to the thermoelements 12 and 14.

In the operation of the thermoelectric generator 10, the ends 18 of the thermoelements 12 and 14 are heated, and the ends 26 of the thermoelements are cooled. To this end, a heat source 30 is provided which is rigidly bonded to the hot strap 16, and a heat radiator 32 is provided which is rigidly bonded to the cold shoes 22 and 24.

In this embodiment, the heat source 30 comprises a tubing 31 of an alloy having the trade name "Hastelloy X," and comprising 46% nickel, 22% chrome, 9% molybdenum, 18% iron, and trace elements. The tubing 31 is heated by passage therethrough of a heated fluid, such as liquid sodium-potassium. For joining the heat source 30 to the hot strap 16, a plurality of intermediate members forming a rigid stack 36 is provided. The stack 36 includes a solid cylinder 38 of a ductile material, such as gold, bonded to the hot strap 16, an insulating member 40 of a relatively high thermal conductance material, such as beryllia or alumina ceramic, bonded to the cylinder 38, and a block 42 of a ductile material, such as gold, bonded between the insulating member 40 and the heat source tubing 31. The block 42 has a concave undersurface conforming in shape to the outside of the tubing 31.

By "ductile" is meant the capability of being molded or "worked," that is, the ability to withstand physical deformation without mechanical failure. Generally speaking, the ductility of a material is inversely related to its yield strength. Examples of suitable ductile materials are gold, palladium, platinum, copper, aluminum, and silver. The choice of the particular material used for the ductile members 38 and 42 is dependent upon the degree of mismatch between the coefficients of thermal expansion of the various members in the hot end of the thermoelectric generator, and upon the temperature at which the generator is to be operated. The worse the thermal expansion mismatch conditions, the greater should be the ductility of the material used. In this respect, gold, which has the greatest ductility, is the preferred material, with the other materials being preferred in the order of increasing yield strength.

In the present embodiment, the heat radiator 32 comprises a pair of aluminum plates 33 bonded one each to each of the cold shoes 22 and 24. To obtain bonding of the aluminum plates 33 to the tungsten shoes 22 and 24, copper shims 44 are disposed therebetween. To prevent cracking of components of the generator due to the differences in the coefficients of thermal expansion of the aluminum radiators, the copper shims 44, and the tungsten shoes, a copper stress compensator member 45 is provided on top of each aluminum plate 33 opposite the copper shims 44.

Figure 3:
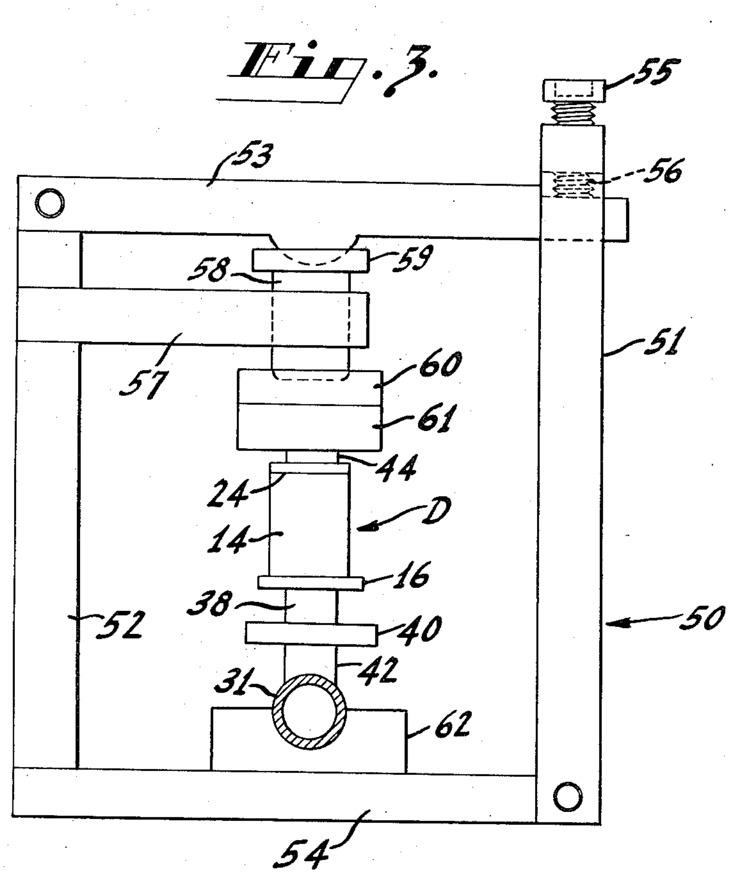
FIG. 3 is a side elevation of apparatus for assembling the thermoelectric generator shown in FIGS. 1 and 2.

In the assembly of the generator 10, a first subassembly A (FIG. 1) is provided by bonding the thermoelements 12 and 14 to the hot strap 16 and to the cold shoes 22 and 24, as in the manner described. A second subassembly B is then formed by bonding the copper shims 44 one each to each of the cold shoes 22 and 24. To accomplish this, one side of each of the shims 44 is provided with a thin, e.g., 0.1 to 0.5 mil, nickel plating, and the nickel plated sides are diffusion bonded to the tungsten shoes in vacuum, using a pressure in the order of 50–500 p.s.i., and heating the members to a temperature around 800° C. for about one hour. A third subassembly C comprising the heat tubing 31 and the gold member 42 is then provided by heating these members to a temperature of 650° C., in vacuum, for about one hour, using a pressure, e.g., in the order of 50 to 500 p.s.i., sufficient to obtain a diffusion bond. The ceramic insulating member 40 is provided with a metallic coating on each side thereof. The metallic coating can comprise, for example a thin, e.g., 0.1 mil nickel plating over a layer of molybdenum in the order of 1 mil thickness. Metallizing of ceramic is known. Thereafter, a subassembly D, comprising the two subassemblies B and C, the insulating member 40, and the gold member 38, are assembled in proper stacked relation within a suitable clamp 50 (FIG. 3) and the entire assembly D is then heated to a temperature of around 800° C., for about one hour, in vacuum, using a pressure, e.g. between 30 and 500 p.s.i., sufficient to form a diffusion bond between each of the various generator contacting members.

In the bonding of the assembly D, it is found desirable to delay applying significant bonding pressure to the assembly D until the gold ductile members 38 and 42 have been heated to an elevated temperature in excess of 400–500°. The ductility of gold increases with temperature, and the increased ductility is effective for preventing cracking of the ceramic insulating member during the bonding operation.

A convenient means for controlling the application of the bonding pressure is by means of the clamp 50. As shown, the clamp 50 comprises a box-like frame having two molybdenum side members 51 and 52, and two steel cross members 53 and 54. The side member 51 is pivotally attached to the cross member 54, and the cross member 53 is pivotally attached to the side member 52 to permit opening and closing of the frame. A screw 55 is provided for locking the end of the cross member 53 within a hole 56 through the side member 51. The clamp 50 further comprises a support arm 57 rigidly secured to the side member 52. The support arm 57 has an opening therethrough for receipt of a molybdenum plunger 58. Also provided are a pair of molybdenum pressure pads 59 and 60, and a pressure pad 61 of a material which has a non-linear rate of thermal expansion and which expands more rapidly at elevated temperatures than at lower temperatures. A suitable material is, for example, Invar. A cradle 62 is secured to the cross member 54.

In the use of the clamp 50, the thermoelectric subassembly D and the pressure pads 59, 60, and 61, and the plunger 58 are assembled in stacked relation within the clamp, the clamp is closed, and the screw 55 is tightened to apply a compressive force to the stacked members between the cross members 53 and 54. The entire assembly is then placed in an oven having a temperature in the order of 800° C. The rate of thermal expansion of the side members 51 and 52 is less than the combined rate of expansion of the stacked members between the cross bars 53 and 54, whereby the stacked members are further compressed between the cross bars 53 and 54. Because the pressure pad 61 expands more rapidly at elevated temperatures than at lower temperatures, however, it is not until the entire assembly has been heated to an elevated temperature that significant compressive forces are applied to the stacked members.

After the bonding of the assembly D, the generator 10 is completed by bonding the radiators 33 and the compensator members 45 to the copper shims 44. This can be accomplished using a suitable clamp, not shown, and heating the assembly to a temperature of around 540° C., for about one hour, in vacuum, using a pressure sufficient to form diffusion bonds between the contacting members.

In operation, the hot strap 16 is heated by conduction of head from the heat source 30 through the stack 36. Although the various members of the stack 36 have different coefficients of thermal expansion, the thermal stresses thus created between the members are absorbed and taken up by the ductile members 38 and 42. That is, the ductile members yield or give under the thermal stresses, thereby absorbing the stresses and not transmitting the stresses to the more rigid members in the stack. In this manner, cracking of the rigid members of the stack is avoided.

Figure 4:
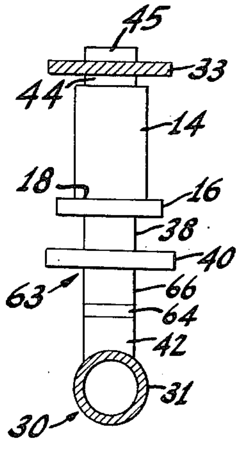
FIG. 4 is view similar to FIG. 2 but showing a modification of the thermoelectric generator.

In another embodiment, shown in FIG. 4, a stack 63 is utilized which includes a stiffening member 64 of a strong and rigid material, such as tungsten, molybdenum, stainless steel or the like, and an extra ductile member 66. The stack 63 can be fabricated in substantially the same manner as the stack 36 is fabricated. With a tungsten or molybdenum stiffening member 64 and gold ductile members 33 and 66, both sides of the member 64 are provided with a thin cladding, e.g., 0.1 mil, of nickel for the purpose of forming diffusion bonds with the gold members.

Figure 2:
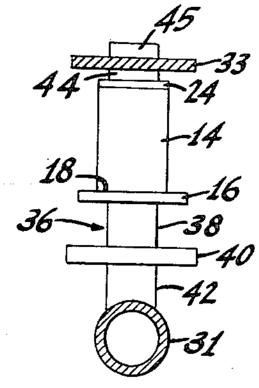
FIG. 2 is a side elevation, partly in section, of the generator shown in FIG. 1.

It is found that with a heat source 30, such as a circular thin walled tubing 31, deformation of the tubing during the bonding operation can occur. The deformation of the tubing 31, in turn, tends to cause excessive deformation of the ductile member 42 which, in the embodiment shown in FIGS. 1 and 2, tends to cause bending of the insulating member 40. This can cause cracking of the brittle member 40 as well as preventing proper bonding of the member 40 to its adjacent members. To protect the member 40 against such bending forces, the rigid member 64 is provided which withstands the non-uniform stresses transmitted through the ductile member 42 and prevents transfer of the non-uniform stresses to the member 40. The additional ductile member 66 serves to absorb the differential thermal expansion stresses between the stiffening member 64 and the insulating member 40.

With other heat sources 30, e.g. a thick walled, strong tubing 31, or rigid flat members, not shown, which are sufficiently strong to resist deformation during the bonding operations, nonuniform stresses are not produced and a stiffening member 48 can be omitted.

With certain nickel-containing heat sources 30, e.g. tubings 31 of "Hastelloy X," the stiffening member 64 preferably further serves as a barrier against diffusion or migration of the nickel from the heat source into the gold member 66 bonded to the ceramic insulating member 40. Such nickel diffusion tends to reduce the ductility of gold and can be the cause of cracking of the insulating member 40. For preventing nickel diffusion, tungsten and molybdenum are the preferred materials, in the order given. The nickel claddings on the stiffening member 46 and the insulating member 40, it is noted, are of such small quantity as not to cause hardening of the gold members 38 or 66.

A further advantage of the use of gold for the various ductile members is that gold readily forms diffusion bonds with many materials, and the bonds so formed have a high degree of stability and strength at elevated temperatures.

What is claimed is:

1. A thermoelectric device for rigid connection between a heat source and a heat sink, comprising a thermoelement having hot and cold ends, a strap made of refractory material bonded to said hot end for thermally connecting said thermoelement to said heat source, a strap made of refractory material bonded to said cold end for thermally connecting said thermoelement to said heat sink, a rigid thermal interconnecting member rigidly connected to said hot strap, said hot and cold straps, thermoelement, and interconnecting member forming a rigid member for connection between said heat source and said heat sink, said interconnecting member comprising, an insulating member, a first ductile member disposed between said hot strap and said insulating member and bonded to said insulating member, a second ductile member bonded to said insulating member, a third ductile member, and a stiffening member disposed between and bonded to said second and third ductile members, all of said ductile members having a thickness greater than said insulating member and serving to compensate for differences in thermal expansion in said straps, stiffening member and thermolelement to prevent thermal stress failure which might otherwise occur when said device is connected between said source and said sink.

References Cited

UNITED STATES PATENTS

| | | | |
|---|---|---|---|
| 3,524,772 | 8/1970 | Purdy | 136—205 |
| 3,607,443 | 9/1971 | Purdy | 136—212 |
| 3,040,539 | 6/1962 | Gaugler | 136—204 |
| 3,342,646 | 9/1967 | Dingwall et al. | 136—205 |
| 3,304,206 | 2/1967 | Burdick et al. | 136—211 |
| 3,338,753 | 8/1967 | Horsting | 136—237 |
| 3,267,115 | 8/1966 | Katon | 310—4 X |
| 3,272,658 | 9/1966 | Rush | 310—4 X |

FOREIGN PATENTS

| | | | |
|---|---|---|---|
| 936,939 | 9/1963 | Great Britain | 310—4 |

HARVEY E. BEHREND, Primary Examiner

U.S. Cl. X.R.

136—201, 211, 237